Figure 1:
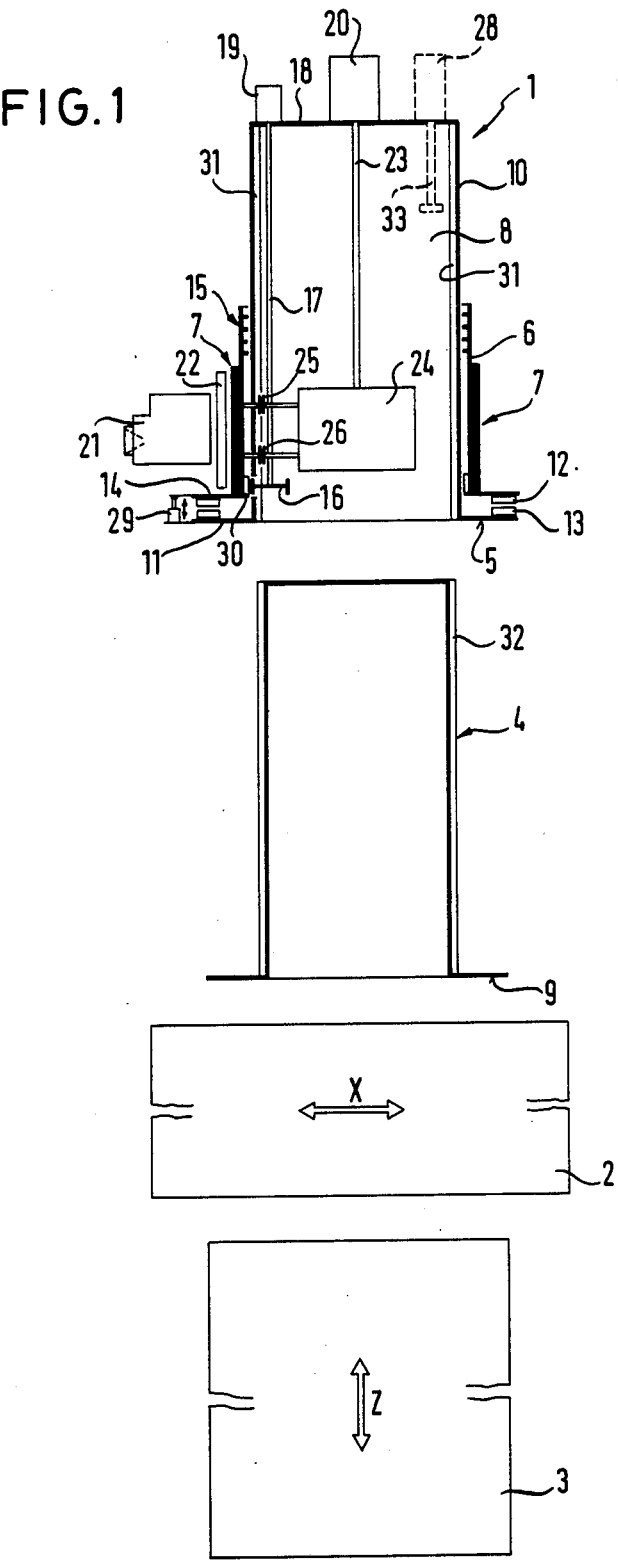

United States Patent [19]

Kölblin et al.

[11] Patent Number: 4,622,734
[45] Date of Patent: Nov. 18, 1986

[54] APPARATUS FOR THE VARIABLE MACHINING OF WORKPIECES

[75] Inventors: Rolf Kölblin, Fischen; Manfred Huber, Munich, both of Fed. Rep. of Germany

[73] Assignee: Wanderer Maschinengesellschaft mbH, Haar, Fed. Rep. of Germany

[21] Appl. No.: 607,179

[22] Filed: May 4, 1984

[30] Foreign Application Priority Data

Aug. 4, 1983 [DE] Fed. Rep. of Germany ....... 3328230

[51] Int. Cl.⁴ .......................................... B23Q 3/155
[52] U.S. Cl. ........................................ 29/568; 408/35
[58] Field of Search ................ 29/568, 563, 26 A; 408/35

[56] References Cited

U.S. PATENT DOCUMENTS

| | | | |
|---|---|---|---|
| 3,650,018 | 3/1972 | Perry et al. | 408/35 X |
| 3,760,472 | 9/1973 | Kielma et al. | 29/568 X |
| 3,979,819 | 9/1976 | Nomura et al. | 29/568 |
| 4,038,739 | 8/1977 | Nohejl | 29/568 |
| 4,051,583 | 10/1977 | Kato et al. | |
| 4,428,256 | 1/1984 | Ida et al. | 29/568 X |
| 4,520,595 | 6/1985 | Diener | 29/563 X |
| 4,563,925 | 1/1986 | Link | 29/568 X |

FOREIGN PATENT DOCUMENTS

| | | |
|---|---|---|
| 1552326 | 11/1972 | Fed. Rep. of Germany . |
| 2013403 | 11/1973 | Fed. Rep. of Germany . |
| 2329671 | 7/1975 | Fed. Rep. of Germany . |
| 2653928 | 6/1978 | Fed. Rep. of Germany . |
| 3245850 | 6/1983 | Fed. Rep. of Germany . |
| 2056350 | 3/1981 | United Kingdom .................. 29/568 |

770737 10/1980 U.S.S.R. .
812980 3/1981 U.S.S.R. .

OTHER PUBLICATIONS

S. V. Leschtschenko, "Sstanki s Tschislovym Programmnym Upravlenijem (NC–Maschinen)", Moskau, Publisher, Maschino-sstrojenije, 1979, pp. 102 and 103, brochure of German Company Berardi, 1980.

*Primary Examiner*—Gil Weidenfeld
*Assistant Examiner*—Steven C. Bishop

[57] ABSTRACT

An apparatus for the variable machining of workpieces is described which consists of a central module, which is constructed as a hollow carrier unit and which takes over the functions of the machine housing, and also of a plurality of horizontal and vertical modules which can be selectively connected with this central module and with one another via predetermined mechanical and electrical interfaces. The central module has an outwardly disposed and rotatably mounted carrier sleeve which can be axially displaced by a restricted amount, which can also be clamped, and which has mounts for tool support units, with the mounts extending over only part of the height of the carrier sleeve and being distributed around its periphery. The inner chamber of the central module is provided with fitted guide surfaces for a vertical module which is constructed as a columnar unit with a base end connection surface and with external guide surfaces complementary to the guide surfaces of the central module. The horizontal module consists of carriages which can be connected to one another and/or to the connection surfaces of the central module and columnar unit.

36 Claims, 2 Drawing Figures

APPARATUS FOR THE VARIABLE MACHINING OF WORKPIECES

The invention relates to an apparatus for the variable machining of workpieces, the apparatus comprising a machine housing which is equipped with drives, with fluid supplies, with control devices and auxiliary devices, and with at least one mount for tools, in particular automatically changeable tools, and which can be connected with controllable carriage units.

Pieces of apparatus of this kind are generally known and are extensively used in practice. In many cases it is however disadvantageous that the machine, which generally represents a comparatively high investment, cannot be used in the ideal manner in relation to the actual machining task. By way of example, a machine which has been constructed for diverse machining tasks, and which thus represents a very high investment cost, can, in particular as a result of changing production requirements, frequently only be used for work which could also be carried out by a machine which offers fewer possibilities and which would therefore be more economical. At the same time situations are likewise often encountered in which tasks which are just a bit more elaborate can no longer be dealt with by a simpler machine so that additional machines have to be acquired. When making further investments of this kind, which are necessary to enlarge the scope of production, care must however be taken to ensure that the existing tools and spindle heads can also be used with the new machines in order to avoid unnecessary costs. This requirement is however in turn a disturbing restriction on the decisions which have to made with regard to the acquisition of machinery.

The principal object underlying the present invention is to further develop an apparatus of the initially named kind so that progressive investment which goes hand in hand with production requirements is possible, so that existing tool systems can at least largely continue to be used, and so that, having regard to the machining requirements and the usability of tool systems, ideal flexibility is always present both from the point of view of fundamental usability of the machine and also from the point of view of the technical machining conditions and in particular of the technical chip forming conditions.

In order to satisfy this object the invention provides an apparatus of the initially named kind which is however characterised in that there is provided a central module, which is constructed as a hollow carrier unit and which takes on the functions of the machine housing, and a plurality of horizontal and vertical modules which can be selectively connected with the central module and with one another via predetermined mechanical and electrical interfaces; in that the central module has a connection surface at its base and an outwardly disposed and rotatably mounted carrier sleeve which can be axially displaced by a restricted amount, which can also be clamped and which has mounts for tool support units, with the mounts extending over only part of the height of the carrier sleeve and being distributed around its periphery; in that the internal chamber of the central module is provided with fitted guide surfaces for a vertical module; in that the vertical module is constructed as a columnar unit with a connection surface at its base end and with external guide surfaces complementary to the guide surfaces of the central module; and in that the horizontal modules consist of carriages which can be connected to one another and/or to the connection surfaces of the central module and columnar unit.

As a result of the consequent subdivision of the apparatus of the invention into individual modules with special functions being associated with each of these modules one provides an apparatus which can be matched to the particular requirements and which can be built up or added to, and also returned to a simpler machine, in accordance with the nature of a modular system. In its simplest form the apparatus consists of a central module which is secured to a stationary support surface. Even in this simplest form the apparatus already offers all the possible variations with regard to the use of different tools, spindle heads and also special spindle heads.

An arrangement displaceable in the Y-direction can be provided by the simple combination of the central module with a vertical module and this arrangement can also be combined with a horizontal module, or with horizontal modules which have been combined together to form a crossed carriage arrangement. Suitably predesigned mechanical and electrical interfaces make this modular build-up or breaking down of the machine possible, and simplify the carrying out of such conversions to a decisive extent.

The central module preferably has a substantially cylindrical basic body with a base end flange, with this flange serving for the connection with further modules. At the opposite end from the connection flange the basic body is provided with a terminal wall which serves as a carrier for drive units, for connection units and also for an apparatus for weight equalisation, which is preferably of hydraulic construction.

The basic body and the carrier sleeve can be clamped hydraulically against one another in the axial direction via face-toothed rings by means of devices disposed in the region of these rings. In the clamped state this arrangement results in the required centering of the carrier sleeve to a high degree of accuracy.

In accordance with a further special feature of the invention the region of the carrier sleeve and of the basic body disposed above the mounts for the tool carrier units is constructed as a pressure fluid distributor with circulation grooves, with the pressure fluid distributor being connected, on the one hand, via lines and/or bores with supply connections on the basic body, and, on the other hand, via bores with the mounts provided on the carrier sleeve.

In this manner it is possible to associate special pressure fluid supplies, which are necessary for special tool carrier units, multi-spindle boring and thread-cutting heads, hydraulic facing heads, NC facing heads, spindle heads with hydrodynamically journalled spindles, spindle heads for deep hole boring and other special heads, with specific mounting positions.

The basic body of the central module is preferably of two part construction with the separating plane lying above the pressure fluid distributor. In this manner it is possible to connect either a cylindrical part with the lower part of the basic body, which extends the lower part of the basic body upwardly, as is necessary in the case of a combination of a central module and a vertical module, or to connect a terminal plate to the lower part of the basic body, so that in the latter case the constructional height is substantially reduced, which can be advantageous if the apparatus of the invention is to be used in its simplest form. The gearing, coupling and auxiliary units which are provided between the main drive and the coupling region for the tool carrier unit which is to be driven in any particular case are preferably mounted and journalled in the inner chamber of the central module in such a way that when using the embodiment with reduced constructional height, i.e. the embodiment with a terminal plate connected to the lower part of the basic body, it is only necessary to use a shortened drive shaft and other simply effected adaptations.

The pivotal movement of the carrier sleeve in two directions is preferably limited by a blocking device to a predeterminable amount, in particular to 270°. This selectively usable blocking device makes it possible to leave electrical connection lines which pass to certain spindle heads, in particular NC facing heads, unchanged even when decoupling the spindle heads from the drive and on pivoting of the carrier sleeve. In this way, without using slip rings, there is no danger of unintentional damage or destruction of these connection lines, and the corresponding heads are always available for use by pivoting them into the working position.

A further important feature of the invention lies in the fact that a respective adaptor plate is provided between the mounts on the carrier sleeve and the drill heads and other heads which are to be coupled therewith. An adaptor plate with an integrated clamping, indexing and, optionally, a release device, and with throughflow channels, is used depending on the particular drill head or unit which is to be arranged in the mount.

Adaptor plates constructed as closure plates are advantageously provided for non-occupied tool mounts.

By means of these adaptor plates it is possible, in simple manner, to couple in drill heads for quick release tapers of different sizes and/or numbers of spindles, multi-spindle spindle heads, NC facing heads and also special heads, with all the supply lines required for the operation of these drill heads or spindle heads preferably passing through the respective adaptor plate.

It is significant in practice that it is also possible to couple in the spindle heads with hydrodynamically journalled spindles, and also spindle heads for the boring of deep holes, because the required supply of pressure fluid and of flushing fluid can likewise take place in the already described manner and it is possible to preselect the respectively required speeds of rotation.

It is of particular significance in the context of the invention that the desired spindle speed can be predetermined by the speed of the main shaft, which is selectable via a gear box associated with the main drive, and/or by a fixed stepping up or stepping down ratio in the gearing of a selectable drill head. In this manner it is possible for each tool to be driven with the optimum speed of rotation, cutting speed and also with the optimum torque for its operation.

A drill head changer and/or a changing system for multi-spindle spindle heads is preferably associated with the central module, in addition to the tool changer that is envisaged. The translational movements resulting from the optionally used horizontal and/or vertical modules can be used for tool changing purposes.

A particularly advantageous tool changer is associated with a unitary tool magazine and has a linearly translatable changer arm which can move to three controlled positions and can effect a tool change in each of these positions. The two lateral positions, which can be travelled to one after the other, are in this arrangement associated with a double spindle device, or with an asymmetrical single spindle device, whereas the central position serves for tool changing with a single spindle head.

It is of particular advantage if an additional magazine is associated with the magazine for single tools arranged on the basic body above the carrier sleeve, and if a double-arm tool changer with a vertical pivot axis is provided between these two magazines. This additional magazine is preferably constructed as the second story of a magazine for multi-spindle spindle heads and/or drill heads, with the main changer provided for the spindle heads and drill heads expediently being combined with the double-arm tool changer for the single tools.

The individual modules of the apparatus of the invention are suitable for being coupled onto any desired transfer system, and indeed both with synchronous and also with asynchronous transfer. The individual modules are also able to operate with any palette-type system and also with workpiece movement devices, in particular for space angle machining (in German:Raumwinkelbearbeitung).

As a result of the universal possibilities of coupling tools and tool heads to the corresponding mounts of the carrier sleeve, or to the adaptors which are provided there, it is possible to mount practically any units that may be desired, which means that each user has the possibility of continuing to use the tool system he already has, at least in the previous manner, but can nevertheless ideally adapt to the prevailing machining task by the additional use of interchangeable spindle stocks. From the point of view of economical considerations this is of very special significance.

Further advantageous embodiments of the invention are set forth in the subordinate claims.

Figure 2:
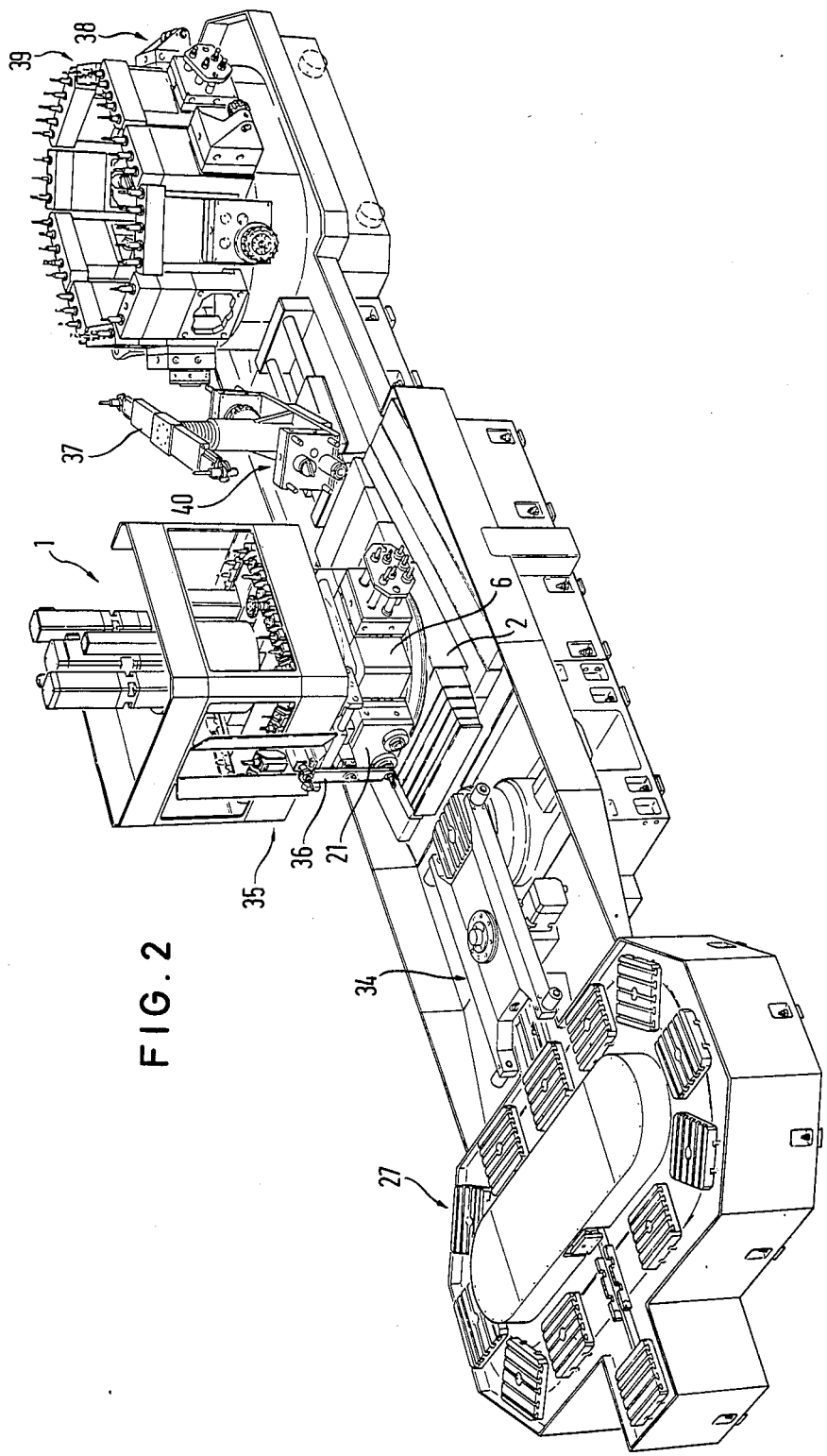

The invention will now be described in more detail by way of example only and with reference to the drawings which show:

FIG. 1 a schematic illustration of the various modules of an apparatus in accordance with the invention which can be combined with one another, and FIG. 2 a perspective illustration of preferred embodiment of the invention in combination with a palette-type workpiece store and a magazine for multi-spindle spindle heads, drill heads and the like and also for individual tools.

As seen in FIG. 1 there is provided a central module 1, a horizontal module 2 which is associated with the X-direction, a horizontal module 3 which is associated with the Z-direction and also a vertical module 4.

The horizontal modules 2 and 3 can be carriages constructed in the customary manner, but must however have suitable connection surfaces for the vertical module 4 and for the central module 1.

The central module 1 has a substantially cylindrical basic body 10 which is equipped at its lower end with a flange 11. The surface of this flange 11 which faces away from the basic body 10 forms a connection surface 5 by which the central module 1 can be secured either to a fixed surface or to one of the horizontal modules 2, 3.

The lower region of the basic body 10 of the central module 1 is surrounded by a carrier sleeve 6 which is rotatably mounted and which can be displaced in an axial direction by a restricted amount. This carrier sleeve 6 is likewise provided at its lower end with a flange 14 which faces the flange 11 of the basic body 10.

Two face-toothed rings 12, 13 which cooperate with one another are arranged between the two flanges 11 and 14, with the ring 12 being fixedly connected with the flange of the base body and with the ring 13 being fixedly connected with the flange of the carrier sleeve. Piston-in-cylinder arrrangements 29 are located adjacent to these face-toothed centering and indexing rings 12, 13 and make it possible, on the one hand, to lift the carrier sleeve and thus to decouple the face-toothed rings 12, 13, and, on the other hand to mutually clamp the rings 12, 13 against one another and thus to center the carrier sleeve 6.

The carrier sleeve 6 is provided with a ring gear 30 which cooperates with a pinion 16 which is connected with a drive motor 19 via a shaft 17. In this manner, with the toothed rings 12, 13 in the decoupled state, the carrier sleeve 6 can be pivoted relative to the base body 10 in the manner desired in a particular case.

The carrier sleeve 6 has a plurality of mounts 7 for tool carrier units, in particular four such mounts, which are located adjacent the ring flange 14 and are uniformly distributed over the periphery of the carrier sleeve. It is possible, by way of example, to secure drill heads 21 for quick-release tapers of different sizes and-/or different numbers of spindles to these mounts 7 via adaptor plates 22. In the region of the carrier sleeve 6 above the mounts 7 there is provided a schematically illustrated pressure fluid distributor, indicated by the reference numeral 15, which can be connected, on the one hand, via lines and/or bores with connections on the basic body, and, on the other hand, via bores with the mounts 7 on the carrier sleeve 6. These bores, which can be of different numbers and/or dimensions, at least in part, are closable and freeable independence on the relative position of the basic body 10 and the carrier sleeve 6. In this manner special functions can be associated with the stations distributed around the periphery of the basic body for the various mounts 7, in addition to their respective universal functions, with these special functions again being independent of the nature of the tool carrier unit which is actually provided in the respective mount.

The basic body 10 has a terminal wall 18 at its upper end which serves as a carrier for various drive motors, in particular the motor 19 for driving the pinion 16, the main drive motor 20 and an optionally mountable motor 28 for displacing the central module 1 in the Y-direction.

The main drive motor 20 is connected via a change-over gear and a shaft 23 with a gear and control unit 24 mounted in the basic body 10. The gear and control unit 24 can be connected via couplings 25, 26 with the tool carrier unit 21 which is secured in any particular case to a mount 7 via an adaptor plate 22.

The gear and control unit 24 embraces an angle transmission (for example mitre gearing) for transmitting the drive power via the clutch 25 to the respective tool carrier unit. Furthermore, this unit contains alignment devices including angular transducers, blocking elements for fixing spindle and coupling positions and also further auxiliary devices. The central module that has been described represents a functionally independent unit which can be mounted on a fixed support and already offers, even in this simplest form of the machine tool, a high degree of variability with regard to the tool carrier units which can be swung into the actual machining position. It is thus suitable for many diverse applications.

The central module 1 is provided with internal guides 31 in its inner chamber which can cooperate with external guides 32 of complementary shape on the vertical module 4, If the vertical module 4 is introduced into the central module 1 then the central module 1 can be displaced as a unit in the Y-direction. The drive motor 28 and a schematically illustrated ball drive 33 are provided for this purpose. A hydraulically operated support device, which is not shown in the drawing but which is secured to the basic body 10, can be provided for weight synchronisation.

The perspective illustration of FIG. 2 shows an embodiment of the apparatus in accordance with the invention in which a central module 1 is combined with a horizontal module 2 and also with a palette-type workpiece store 27 and a magazine 38, 39.

A palette changing device 34 is provided between the palette-type workpiece store 27 and the central module 1. The individual tools provided in a tool store arranged above the carrier sleeve 6, in particular tools with quick-release tapers, can be positioned in the spindle head 21 or other spindle mounts by means of a double-arm tool changer 36 with a horizontal pivot axis.

A horizontally translatable and pivotable main changer 40 is arranged between the central module 1 and the magazine 38 for multi-spindle spindle heads and/or drill heads and/or outside facing heads and the like. In order to substantially increase the capacity of the magazine for individual tools the magazine for the spindle heads and the like is equipped with a second story 39 in which individual tools are provided which can be changed over into the magazine 35 at the central module by means of a double-arm tool changer 35 with a vertical axis of rotation. The double-arm tool changer 37 is combined with the main changer 40 and is preferably so constructed that pivotal and vertical movements of this double-arm tool changer 37 can be controlled independently from the main changer 40. The horizontal drive for the main changer 40 can also be used for the double-arm tool changer 27.

The advantages achieved by the invention are extremely diverse and include in particular the following:

(a) the ability to combine the individual modules with one another, and with auxiliary units such as palette-type workpiece stores and additional tool stores, (b) the maximum variability of the individual mounts, (c) the ability to simply pivot all the mounts from a waiting position to the working position and vice versa, (d) the free choice of the speed of rotation, of the speed of advance and of a torque which is matched to the particular machining task, (e) the ability to use practically all known tool carrier units, (f) the manner in which the choice of the tools and the spindle heads can be readily matched to the particular machining task, (g) the fact that the machine can be universely used in transfer systems, in palette systems and with workpiece moving devices, and (h) the fact that the machine can always be combined with the ideal tool changing systems in any particular case.

Although the appended claims are directed to the combination of the central module with other modules it will be understood that the invention is also directed to the construction of the central module itself.

We claim:

1. Apparatus for the machining of workpieces, the apparatus comprising a central module and a vertical module, wherein said central module comprises:
   a substantially cylindrical and hollow basic body with a longitudinal axis defining an internal chamber extending along said longitudinal axis,
   a hollow carrier sleeve disposed outwardly around said basic body and having at least one mount on a periphery of said carrier sleeve for attachment of various exchangeable tool support units,
   said carrier sleeve being rotatable around said basic body, and wherein said vertical module comprises:
   a hollow columnar unit being arranged in said internal chamber, said central module being moveable along said columnar unit.

2. Apparatus for the machining of workpieces, the apparatus comprising a central module and a vertical module,
   wherein said central module comprises:
   a substantially cylindrical basic body having a cylindrical outer surface, an axis, and an internal chamber;
   internal guides extending along said substantially cylindrical basic body and provided in said internal chamber;
   a hollow carrier sleeve disposed outwardly of said substantially cylindrical basic body, said hollow carrier sleeve having a periphery;
   means for rotating said carrier sleeve about said axis of said basic body;
   means for clamping said carrier sleeve relative to said basic body;
   a plurality of mounts provided on said carrier sleeve and distributed around said periphery for accommodating tool support units; and
   tool drive means mounted at said basic body for driving automatically exchangeable tools provided in said tool support units; and
   wherein said vertical module comprises:
   a hollow columnar unit which fits within said internal chamber of said basic body;
   external guides on said hollow columnar unit complementary to said internal guides for permitting relative axial movement between said central module and said vertical module; and
   flange means at a base end of said hollow columnmar unit for mounting said hollow columnar unit.

3. Apparatus for the machining of workpieces, the apparatus comprising a central module, a vertical module, and at least one horizontal module
   wherein said central module comprises:
   a substantially cylindrical basic body having a cylindrical outer surface, an axis, first and second ends, and an internal chamber;
   internal guides extending along said substantially cylindrical basic body and provided in said internal chamber;
   a hollow carrier sleeve disposed outwardly of said substantially cylindrical basic body, said hollow carrier sleeve having a periphery;
   means for displacing said hollow carrier sleeve axially relative to said substantially cylindrical basic body by a restricted amount;
   means for rotating said carrier sleeve about said axis of said basic body;
   means for clamping said carrier sleeve relative to said basic body;
   a plurality of mounts provided on said carrier sleeve and distributed around said periphery for accommodating tool support units;
   tool drive means mounted at said basic body for driving automatically exchangeable tools provided in said tool support units; and
   a pressure fluid distributor associated with said basic body for operation of said tools;
   wherein said vertical module comprises a hollow columnar unit which fits within said internal chamber of said basic body;
   external guides on said hollow columnar unit complementary to said internal guides for permitting relative axial movement between said central module and said vertical module; and
   flange means at a base end of said hollow columnar unit for mounting said hollow columnar unit on said at least one horizontal module; and
   wherein said at least one horizontal module comprises a carriage and slide means permitting movement of said carriage in a horizontal direction.

4. An apparatus according to claim 3, wherein said cylindrical basic body comprises a base end flange having a lower surface which forms a connection surface and having an upper surface which carries a face-toothed ring which meshes with a complementary face-toothed centering ring provided at a lower side of an annular flange attached to a lower end of said carrier sleeve.

5. An apparatus according to claim 4, wherein said basic body has, at its end opposite the connection surface, an upper wall which is at least substantially closed and is constructed as a carrier for drive units, connection units and auxiliary units.

6. An apparatus according to claim 4, comprising devices disposed in the region of said rings for clamping said basic body and said carrier sleeve hydraulically against one another in axial direction via said face-toothed rings.

7. An apparatus according to claim 6, comprising a pressure fluid distributor provided with circulation grooves in the region of the carrier sleeve and of the basic body above said mounts, said pressure fluid distributor being connected with supply connections on the basic body and via bores with said mounts.

8. An apparatus according to claim 7, wherein said bores are at least partly different from each other, and are adapted to be closed and freed depending on the relative position of the basic body and the carrier sleeve.

9. An apparatus according to claim 6, wherein said means for rotating said carrier sleeve relative to said basic body comprises a motor attached to an upper wall of said basic body, a pinion arranged radially inside of and in the rigion of said face-toothed rings, and a shaft journalled in said basic body and drivingly connected to said motor.

10. An apparatus according to claim 7, wherein transmission, coupling and auxiliary units between a main drive arranged on said upper wall of the basic body and the coupling region for each of the tool carrier units are mounted and journalled in the inner chamber of the central module.

11. An apparatus according to claim 10, wherein said basic body has an upper part and a lower part, a separating plane between said two parts being disposed above said pressure fluid distributor.

12. An apparatus according to claim 11, wherein a cylindrical part which extends the lower part of the basic body upwardly is a carrier for drive units and auxiliary units.

13. An apparatus according to claim 11, wherein a terminal plate which is connected to the lower part of the basic body is a carrier for drive units and auxiliary units.

14. An apparatus according to claim 3, comprising clampable shallow track guides with a large guide ratio of at least 8:1, between the basic body and the vertical module.

15. An apparatus according to claim 3, wherein said basic body has an internal contour which is polygonal in cross-section.

16. An apparatus according to claim 3, wherein said basic body has an internal contour which is rectangular in cross-section.

17. An apparatus according to claim 3, wherein at least one tool changing system is arranged above the carrier sleeve on the basic body.

18. An apparatus according to claim 3, wherein two tool changing systems are arranged above the carrier sleeve, said tool changing systems being of different construction.

19. An apparatus according to claim 3, comprising a blocking device for restricting pivotal movement of the carrier sleeve in two directions to a predetermined amount.

20. An apparatus according to claim 19, wherein said amount is 270°.

21. An apparatus according to claim 10, wherein drill heads adapted to be coupled with said main drive in the working position and which are connected in clamped state with all required fluid connections, are mounted in said mounts.

22. An apparatus according to claim 10, wherein drill heads adapted to be coupled with said main drive in the working position and which are connected in clamped state with all required fluid connections, are exchangeably mounted in said mounts.

23. An apparatus according to claim 21, comprising an adaptor plate between each mount and the respective drill head.

24. An apparatus according to claim 23, wherein said adaptor plate has an integrated clamping and indexing device and through flow channels to the respective drill head.

25. An apparatus according to claim 22, wherein said integrated device also excludes a release device.

26. An apparatus according to claim 23, wherein said adaptor plate is a closure plate for non-occupied tool mounts.

27. An apparatus according to claim 19, wherein said mounts are adapted, via adaptor plates, for the coupling of drill heads for quick-release tapers of different sizes and numbers of spindles, for the coupling of multi-spindle boring heads and for the coupling of NC facing heads and special heads.

28. An apparatus according to claim 27, wherein said special heads are spindle heads for hydrodynamically journalled spindles and spindle heads for boring deep holes.

29. A apparatus according to claim 27, comprising electrical connection lines leading to the spindle heads, which are non-interruptable, even on decoupling from the drive and on pivoting of the carrier sleeve.

30. An apparatus according to claim 21, comprising means for pre-selecting cutting speed and the torque, via a gear box associated with the main drive.

31. An apparatus according to claim 3, comprising at least one tool changer and a drill head changer associated with the central module.

32. An apparatus according to claim 31, comprising a unitary tool magazine, a tool changer, for said magazine, said changer having a linearly translatable changer arm and three controllable positions, including two lateral positions associated with a spindle device, and a central position for tool change with a single spindle head.

33. An apparatus according to claim 32, comprising a magazine for single tools attached to the basic body above the carrier sleeve, an additional magazine, a first double-arm tool changer with a horizontal pivot axis for equipping drill heads associated with the magazine, and a second double-arm tool changer with a vertical pivot axis adapted to be translated in a horizontal direction between the magazine on the basic body and the additional magazine.

34. An apparatus according to claim 33, wherein the additional magazine is a circulating magazine with a first stage for multiple heads, and a second stage for individual tools; and wherein the second double-arm tool changer is mounted on a main changer for the multiple heads which acts between the first stage of the magazine and the mounts on the carrier sleeve.

35. An apparatus according to claim 34, wherein the second double-arm tool changer is extendable in telescope-like manner in a vertical direction.

36. An apparatus according to claim 35, wherein the second double-arm tool changer is actuable independently of the main changer.

* * * * *